United States Patent [19]

Mamin et al.

[11] Patent Number: 5,804,710
[45] Date of Patent: Sep. 8, 1998

[54] ATOMIC FORCE MICROSCOPE SYSTEM WITH MULTI-DIRECTIONAL VOICE COIL ACTUATOR FOR CONTROLLING THE STYLUS

[75] Inventors: Harry Jonathon Mamin, Palo Alto; Daniel Rugar, Los Altos; Bruce David Terris, Sunnyvale, all of Calif.

[73] Assignee: International Business Machines Corporation, Armonk, N.Y.

[21] Appl. No.: 869,642

[22] Filed: Jun. 5, 1997

[51] Int. Cl.$^6$ .................................................. G01B 5/28
[52] U.S. Cl. .................................................. 73/105
[58] Field of Search .......................... 73/105; 250/306

[56] References Cited

U.S. PATENT DOCUMENTS

| | | | |
|---|---|---|---|
| 4,948,703 | 8/1990 | Falcone et al. | 430/281 |
| 5,345,815 | 9/1994 | Albrecht et al. | 73/105 |
| 5,535,185 | 7/1996 | Kishi et al. | 250/306 X |
| 5,537,372 | 7/1996 | Albrecht et al. | 369/43 |
| 5,581,538 | 12/1996 | Inui et al. | 250/306 X |

OTHER PUBLICATIONS

Itoh et al., "Piezoelectric Cantilever Array for Multiprobe Scanning Force Microscopy", IEEE, 1996, pp. 451–455.
Minne et al., "Parallel Atomic Force Microscopy Using Cantilevers with Integrated Piezoresistive Sensors and Integrated Piezoelectric Actuators", Appl. Phys. Lett., vol. 67, No. 26, 25 Dec. 1995, pp. 3918–3920.
Tortonese et al., "Atomic Resolution with an Atomic Force Microscope Using Piezoresistive Detection", Appl. Phys. Lett., vol. 62, No. 08, 22 Feb. 1993, pp. 834–836.
G. Binnig et al., "Atomic Force Microscope", *Physical Review Letters*, vol. 56, No. 9, Mar. 3, 1986, pp. 930–933.
S. Y. Chou et al., "Imprint Lithography with 25–Nanometer Resolution", *Science*, vol. 272, Apr. 5, 1996, pp. 85–87.
H. Kado et al., "Nanometer–scale Recording on Chalcogenide Films with an Atomic Force Microscope", *Applied Physics Letters*, vol. 66, No. 22, May 29, 1995.

H. J. Mamin et al., "High–density Data Storage Using Proximal Probe Techniques", *IBM Journal of Research and Development*, vol. 39, No. 6, Nov. 1995, pp. 687–688.
H. J. Mamin, "Thermal Writing Using a Heated Atomic Force Microscope Tip", *Applied Physics Letters*, vol. 69, No. 3, Jul. 15, 1996, pp. 433–435.
S. R. Manalis et al., "Atomic Force Microscopy for High Speed Imaging Using Cantilevers with an Integrated Actuator and Sensor", *Applied Physics Letters*, vol. 68, No. 6, Feb. 5, 1996, pp. 871–873.

(List continued on next page.)

Primary Examiner—Hezron E. Williams
Assistant Examiner—Daniel S. Larkin
Attorney, Agent, or Firm—Thomas R. Berthold

[57] ABSTRACT

An atomic force microscope (AFM) system has a bidirectional actuator to move the AFM tip or stylus in a plane parallel to the surface of the sample to be scanned as well as perpendicularly to the surface of the sample. The actuator is a modified voice coil motor actuator of the type used in compact disc (CD) drives. The stylus is mounted at the end of a support arm that is held in the actuator by a flexure, the flexure permitting movement in the two directions. A set of permanent magnets and two sets of independently controllable electric coils allow the support arm to be moved in the two directions. In a data storage application, a data disk has a series of surface features that represent machine-readable data and the bidirectional actuator is supported by a secondary actuator that moves the primary actuator along a radius of the disk. This allows the bidirectional actuator with the attached stylus to be located to a coarse position within a desired band of data tracks. Tracking control circuitry connected to one set of coils allows the stylus to be maintained on a specific data track within a band and moved to other tracks within the band. Load control circuitry connected to the other set of coils allows the perpendicular load on the stylus to be maintained generally constant so that deflections of the cantilever due to the disk surface features can be decoded as data.

15 Claims, 9 Drawing Sheets

OTHER PUBLICATIONS

Y. Martin et al., "High–resolution Magnetic Imaging of Domains in TbFe by Force Microscopy", *Applied Physics Letters*, vol. 52, No. 3, Jan. 18, 1988, pp. 244–246.

G. Meyer et al., "Simultaneous Measurement of Lateral and Normal Forces with an Optical–beam–deflection Atomic Force Microscope", *Applied Physics Letters*, vol. 57, No.20, Nov. 12, 1990, pp. 2089–2091.

B. D. Terris et al., "Localized Charge Force Microscopy", *Journal of Vacuum Science Technology*, vol. 8, No. 1, Jan./Feb. 1990, pp. 374–377.

B. D. Terris et al. "Data Storage in NOS: Lifetime and Carrier–to–Noise Measurements", *IEEE Transactions on Electron Devices*, vol. 42, No. 5, May 1995, pp. 944–949.

B. D. Terris et al., "Nanoscale Replication for Scanning Probe Data Storage", *Applied Physics Letters*, vol. 69, No. 27, Dec. 30, 1996, pp. 4262–4264.

Y. Xu et al., "Microelectromechanical Scanning Tunneling Microscope", *Proceedings of the 8th International Conference on Solid–State Sensors and Actuators, and Eurosensors IX*, Stockholm, Sweden, Jun. 25–29, 1995, pp. 640–643.

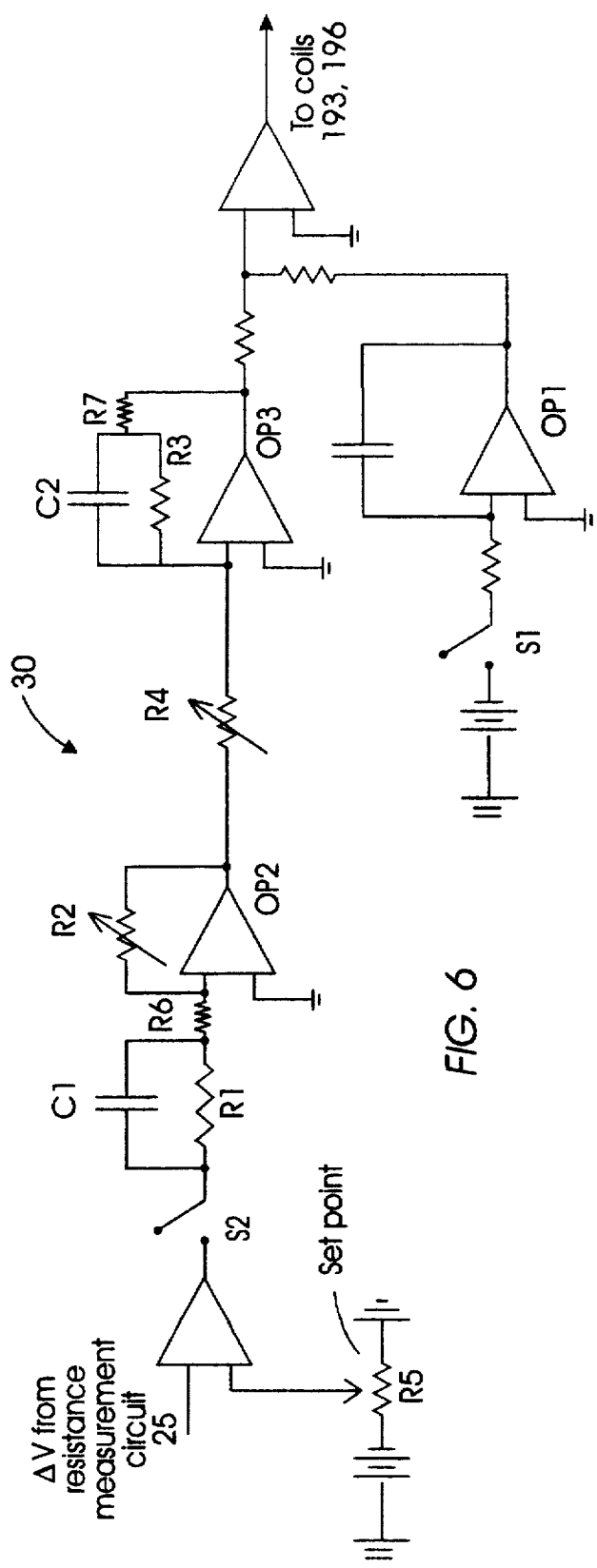
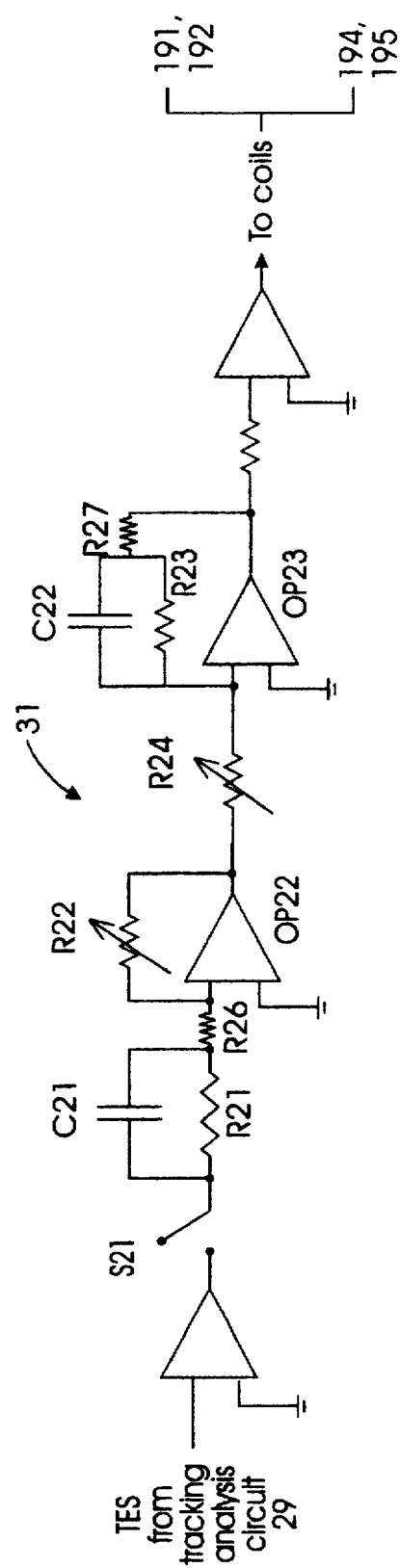
FIG. 6
FIG. 7

ATOMIC FORCE MICROSCOPE SYSTEM WITH MULTI-DIRECTIONAL VOICE COIL ACTUATOR FOR CONTROLLING THE STYLUS

TECHNICAL FIELD

This invention was made with Government support under contract DABT63-95-C-0019 awarded by the Defense Advanced Research Projects Agency of the U.S. Department of Defense. The Government has certain rights in this invention.

This invention relates to atomic force microscope (AFM) systems that employ a microfabricated cantilever having a stylus or tip at its free end for scanning the surface of a sample, and more particularly to an AFM system with a multi-directional voice coil actuator for controlling the loading and positioning of the cantilever tip.

BACKGROUND OF THE INVENTION

Atomic force microscopy is based upon the principle of sensing the forces between a sharp stylus or tip and the surface to be investigated. The interatomic forces induce the displacement of the tip mounted on the free end of a cantilever.

As described by Binnig et al., "Atomic Force Microscope", *Phys. Rev. Lett.*, Vol. 56, No. 9, Mar. 3, 1986, pp. 930–933, a sharply-pointed tip is attached to the free end of a flexible spring-like cantilever to scan the profile of a surface to be investigated. The attractive or repulsive forces occurring between the atoms at the apex of the tip and those of the surface result in tiny deflections of the cantilever. its original implementation, a tunneling junction was used to detect the motion of the tip attached to an electrically-conductive cantilever. An electrically-conductive tunnel tip is disposed within the tunnel distance from the back of the cantilever, and the variations of the tunneling current are indicative of the cantilever deflection. The forces occurring between the tip and the surface under investigation are determined from the measured cantilever deflection and the characteristics of the cantilever.

The principle of atomic force microscopy has been extended to the measurement of magnetic, electrostatic, and frictional forces, with the tip operating in either contact or near-contact with the surface of the sample. Magnetic force microscopy using a magnetized iron tip is described by Martin et al., "High-resolution Magnetic Imaging of Domains in TbFe by Force Microscopy", *Appl. Phys. Lett.*, Vol. 52, No. 3, Jan. 18, 1988, pp. 244–246. Electrostatic force microscopy is described by Terris et al., "Localized Charge Force Microscopy", *J. Vac. Sci. Technol. A*, Vol. 8, No. 1, January/February 1990, pp. 374–377. Frictional force microscopy is described in Meyer et al., "Simultaneous Measurement of Lateral and Normal Forces with an Optical-beam-deflection Atomic Force Microscope", *Appl. Phys. Lett.*, Vol. 57, No. 20, Nov. 12, 1990, pp. 2089–2091. As in atomic force microscopy as originally conceived by Binnig et al., the forces in all of these techniques are determined from the measured cantilever deflection and the characteristics of the cantilever. It can be argued that whereas magnetic, van der Waals, electrostatic, and frictional forces differ in magnitude and range of interaction, they are all ultimately atomic in nature. Accordingly, the term "atomic force microscope" as used herein includes any scheme in which a tip attached to a cantilever is moved with respect to a surface, and the deflection of the cantilever is used to ascertain the force exerted on the tip by the sample, regardless of the range or origin of the interaction between the tip and the sample.

AFM systems have applications beyond their original application of imaging the surface of a sample. For example, AFM systems have been proposed for data storage, as described in IBM's U.S. Pat. No. 5,537,372. In that application, the tip on the cantilever free end is in physical contact with the surface of a data storage medium. The medium has surface incongruences in the form of bumps and/or depressions that represent data. The deflection of the cantilever is detected and decoded to read the data. Data can also be written on the medium, if the medium has a heat-deformable surface, by heating the cantilever tip when it is in contact with the medium surface to form bumps or depressions on the medium surface.

In addition to tunneling current detection, several other methods of detecting the deflection of the AFM cantilever are available. Optical beam deflection is currently the most common form of detection used in commercial instruments but does not provide an integrated, purely electrical signal readout. Other methods include optical interferometry, capacitive techniques, and more recently piezoresistance.

The principle of piezoresistance to detect the deflection of the AFM cantilever is described in U.S. Pat. No. 5,345,815. The cantilever is formed of single-crystal silicon which is implanted with a dopant to provide a piezoresistive region along the length of the cantilever. Deflection of the free end of the cantilever produces stress in the cantilever. That stress changes the electrical resistance of the piezoresistive region in proportion to the cantilever's deflection. A resistance measuring apparatus is coupled to the piezoresistive region to measure its resistance and to generate a signal corresponding to the cantilever's deflection.

The most common type of actuator for translating the AFM tip relative to the sample is a piezoelectric element. Various shapes of piezoelectric elements have been used, the most common of which is the cylindrical tube scanner. The outer wall of the cylindrical tube is patterned with four electrodes, each covering a quarter of the cylinder circumference, and a single electrode is located on the inner wall. The application of a voltage to two electrodes on opposite sides of the cylinder will cause one end of the cylinder to bend if the opposite end is held fixed. The range of motion of the piezoelectric cylindrical tube scanner is relatively limited and is typically less than 100 microns with a bandwidth of the order of 10 Hz.

To increase the bandwidth of AFM scanners, microfabricated silicon actuators have been proposed. One such actuator uses a comb electrostatic drive motor for moving the AFM tip in the X-Y plane and a torsional bar with capacitor plates for moving the tip in the Z direction, as described by Xu et al., "Microelectromechanical Scanning Tunneling Microscope", TRANSDUCERS '95, *8th International Conf. on Solid-State Sensors And Actuators, and Eurosensors IX*, Stockholm, Sweden, Jun. 25–29, 1995. This type of actuator has a limited out-of-plane range of motion, on the order of microns. One dimensional high speed AFM actuators have also been fabricated by depositing thin films of piezoelectric material, such as ZnO, onto a lever, as described by Manalis, et al., "Atomic force microscopy for high speed imaging using cantilevers with an integrated actuator and sensor", *Appl. Phys. Lett.* 68 (6), 5 Feb. 1996, pp. 871–873. This type of actuator has a very limited range of motion and moves the AFM tip in only one direction.

What is needed is a multi-directional, high speed, long range AFM actuator.

SUMMARY OF THE INVENTION

The invention is an atomic force microscope system that uses a bidirectional actuator to move the stylus in a plane parallel to the surface of the sample to be scanned as well as perpendicularly to the surface of the sample. The actuator is a modified voice coil motor actuator of the type used in compact disc (CD) drives. The stylus is mounted at the end of a support arm that is held in the actuator by a flexure, the flexure permitting movement in the two directions. A set of permanent magnets and two sets of independently controllable electric coils allow the support arm to be moved in the two directions.

In an AFM based data storage application, a data disk has a series of surface features that represent machine-readable data and the bidirectional actuator is supported by a secondary actuator that moves the primary actuator along a radius of the disk. This allows the bidirectional actuator with the attached stylus to be located to a coarse position within a desired band of data tracks. Tracking control circuitry connected to one set of coils allows the stylus to be maintained on a specific data track within a band and moved to other tracks within the band. Load control circuitry connected to the other set of coils allows the perpendicular load on the stylus to be maintained generally constant so that deflections of the cantilever due to the disk surface features can be decoded as data.

For a fuller understanding of the nature and advantages of the present invention, reference should be made to the following detailed description taken together with the accompanying figures.

BRIEF DESCRIPTION OF THE DRAWING

FIG. 6 is a schematic of the load control circuit for controlling the primary actuator to position the stylus perpendicularly relative to the surface of the disk.

FIG. 7 is a schematic of the tracking control circuit for controlling the primary actuator to position the stylus in the plane of the surface of the disk to maintain the stylus on a track and to move it within a band of tracks.

DESCRIPTION OF THE PREFERRED EMBODIMENTS

Figure 1:
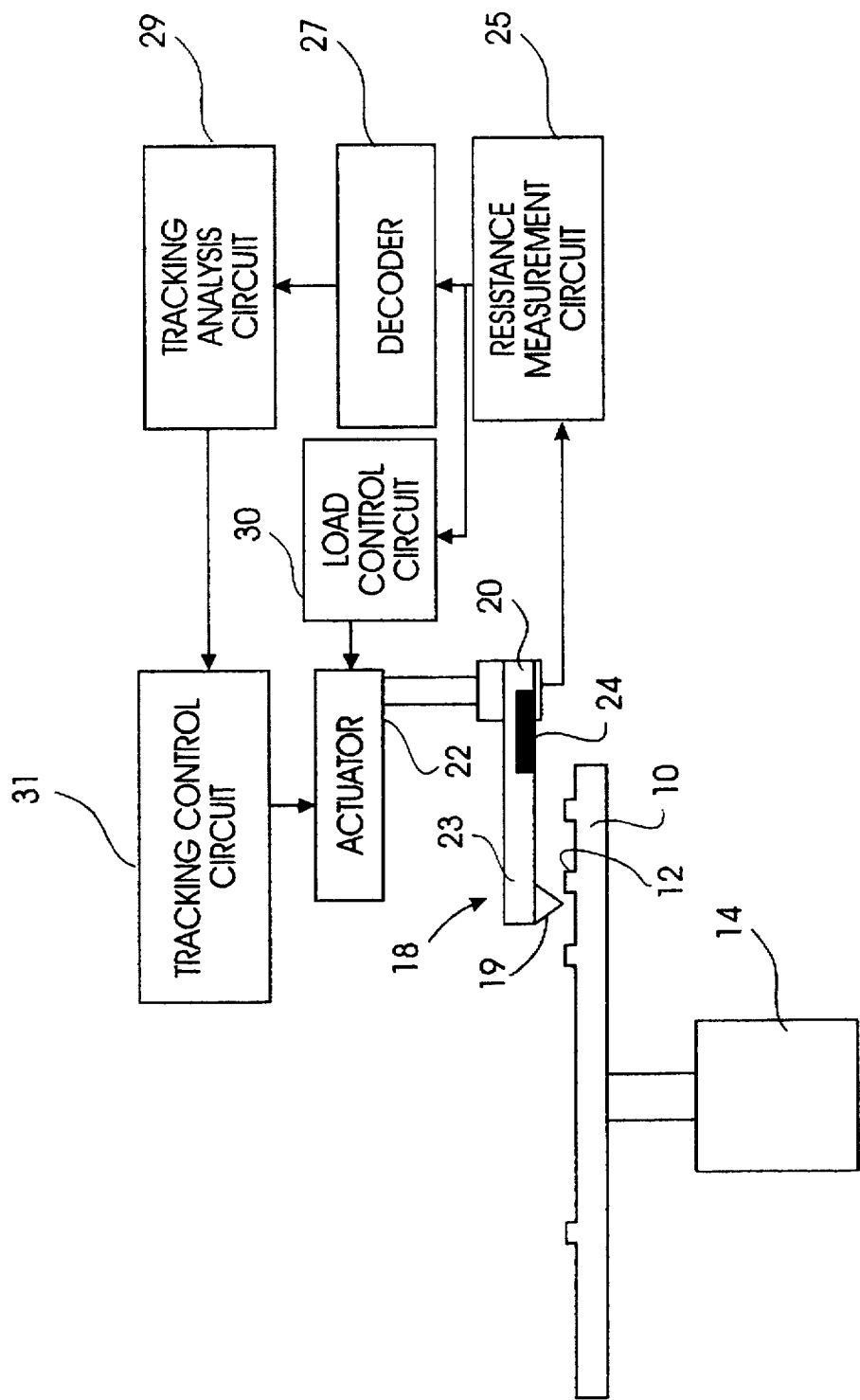
FIG. 1 is a block diagram of the AFM data storage system of the present invention.

Referring to FIG. 1, an AFM system is shown schematically as an AFM data storage disk drive with a rotatable data storage disk. While the AFM system will be described in terms of the preferred embodiment of a disk drive, the present invention is applicable to any AFM system where an actuator is required to move the stylus both perpendicular to the surface of the AFM sample and to move the stylus parallel to the surface of the sample to scan the sample.

In FIG. 1, the storage medium is preferably a circular disk 10 and may be formed in a number of ways. The disk 10 is preferably made from a polymer material, such as polymethyl methacrylate (PMMA), polycarbonate, or an acrylate-based, photo-curable polymer, as described in U.S. Pat. No. 4,948,703. The disk 10 is embossed on the upper face with machine-readable information, shown as surface incongruences 12. The phrase "machine-readable information" means information that is readable by a digital processing resource such as a programmed computer or microprocessor. More specifically, a plurality of data tracks are provided having a series of surface incongruences arranged in a machine-readable pattern of data marks or features. The embossed incongruences may be a series of pits or indentations separated by island portions of the disk 10 that are not pitted. Alternatively, instead of pits, a series of raised protuberances or bumps could be provided, as shown by bumps 12. The data tracks are grouped into radially spaced bands on the disk and may be formed as either discrete concentric tracks, as in conventional digital magnetic recording disk drives, or spiral tracks, as in compact disc (CD) optical recording. Alternatively, the storage medium need not be circular and need not be moved in a rotary manner.

The disk 10 is positioned above a motor spindle 14. The disk 10 is supported on the motor spindle and rotated at a uniform speed by the motor 14. The disk 10 is positioned so that the center of the disk is located approximately at the center of rotation of the spindle motor. If the medium is formed other than as a disk, such as a flat sheet, it can be moved relative to the AFM stylus by any suitable mechanical device. In the general case of an AFM system the sample can be moved relative to the stylus by use of a conventional X-Y scanner stage. Alternatively, the sample can be held fixed and the stylus holder moved in the X-Y plane.

A high resolution contact sensor 18 with stylus 19 mounted on a support 20 is positioned above the disk. The support 20 is connected to an actuator 22. The contact sensor 18 includes a microfabricated cantilever 23 extending at one end from a base attached to support 20. The cantilever 23 is fabricated of single-crystal silicon which is implanted with a dopant to provide a piezoresistive region 24 that is electrically conducting, with its resistance changing as the cantilever is bent. Such a device can be fabricated from doped silicon as described in U.S. Pat. No. 5,345,815. A sharp stylus 19 is located at the free end of the cantilever 23. The stylus 19 is positioned to engage the surface of the storage disk 10. The stylus is downwardly biased so that it tracks the surface topography of the disk. When the disk 10 is rotated, the cantilever 23 rises and falls as the stylus 19 tracks over the incongruences 12 on the surface of the storage disk 10.

A resistance measurement circuit 25 is connected to the cantilever 23 by means of conducting wires. As the stylus 19 tracks the incongruences of the storage disk 10, the resistance of piezoresistive region 24 on cantilever 23 changes. This change is continuously monitored and measured by means of the resistance measurement circuit 25.

Figure 2:
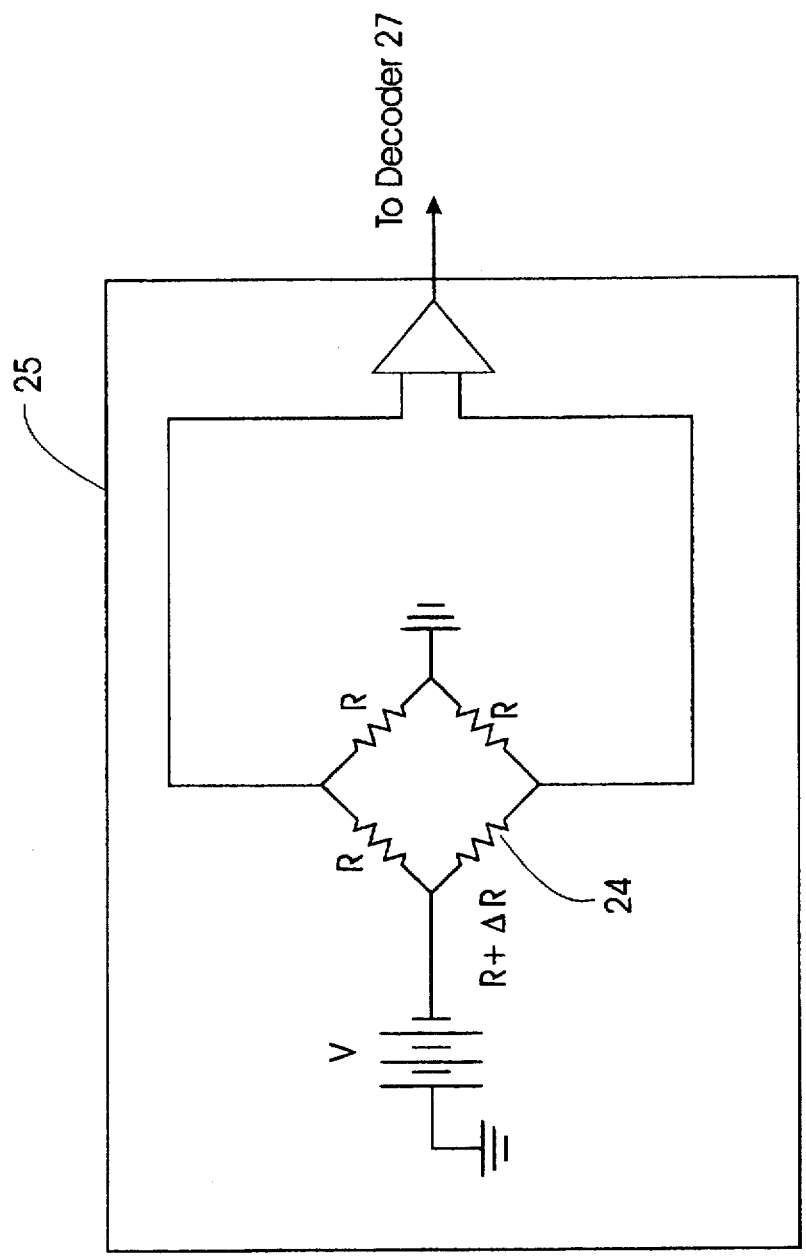
FIG. 2 is a schematic of the resistance measurement circuit used to detect cantilever deflections in the AFM data storage system.

Referring to FIG. 2, the resistance measurement circuit 25 has a drive voltage (V) and a resistance bridge suitable for measuring small changes in resistance (ΔR). Each of the three fixed resistors R in the bridge has a resistance approximately equal to the resistance on the piezoresistive region 24 of cantilever 23 when it is not bent. The piezoresistive region 24 of cantilever 23 has a resistance (R+ΔR) when it is bent. The measured output voltage ΔV due to the change in resistance ΔR of the cantilever when it is bent is approximately:

$$(V/4)*(\Delta R/R)$$

The typical fractional change in lever resistance, ΔR/R, is of the order $10^{-7}$ to $10^{-5}$ per Angstrom of deflection. For incongruences 50 nm high and a driving voltage of 2 volts, this produces an output voltage ΔV of approximately 0.1–10 mV. This analog voltage change from resistance measurement circuit 25 is amplified and then converted into a digital signal by a decoder 27. Such decoding can be done either by means of conventional peak detection or threshold detection, depending on the method of data encoding used.

Referring again to FIG. 1, the actuator 22 includes an electromagnetically-driven, voice coil type primary actuator, as is found in an optical disk or CD player, modified as will be described below to support and position the cantilever 23 with stylus 19. The actuator 22 is movable both along an axis perpendicular to the disk surface for controlling the load of the stylus 19 on disk 10, and in the plane parallel to surface of disk 10. The motion in the plane parallel to the surface of disk 10 is in the radial direction from the center of rotation of the disk 10 and allows the stylus 19 to be maintained on a data track and positioned to different data tracks. The stylus load is controlled by load control circuit 30 and the stylus fine track positioning is controlled by tracking control circuit 31.

The system of FIG. 1 can be operated in a "constant force" mode, a "constant height" mode, or a combination thereof. In a constant force mode, the movement of the actuator 22 perpendicular to the disk is controlled by the load control circuit 30 which uses information obtained from the piezoresistive region 24 in cantilever 23, via the resistance measurement circuit 25 as to the features and marks on the disk surface. The signal sent to the actuator 22 from the load control circuit 30 can be used to maintain constant cantilever deflection, and thus a constant loading force on the stylus 19. In constant height mode, the actuator 22 does not move the cantilever 23 perpendicular to the disk surface so the cantilever deflects varying amounts as the surface incongruences pass under it. In combination mode, the load control circuit 30 and actuator 22 are used to maintain a generally constant loading force on a long time scale, taking out variations due to long-term drift, for example, or large features on the surface of the disk. The cantilever 23 is left free to deflect, however, as the stylus 19 encounters the small surface incongruences. In a data storage application, the combination mode is the preferred embodiment. In each case, however, the signal from the resistance measurement circuit 25 is used as the input to the decoder 27, which converts it to binary form, i.e., machine-readable information, in a manner well known in the art.

While the use of a silicon cantilever 23 with a doped piezoresistive region 24 and the resistance measurement circuit 25 is the preferred method of detecting the cantilever deflection, the cantilever deflection can also be detected by other known techniques, such as the reflected laser light method described in the '372 patent. Regardless of the cantilever deflection detection technique used, the output is decoded into digital data by decoder 27.

Figure 3:
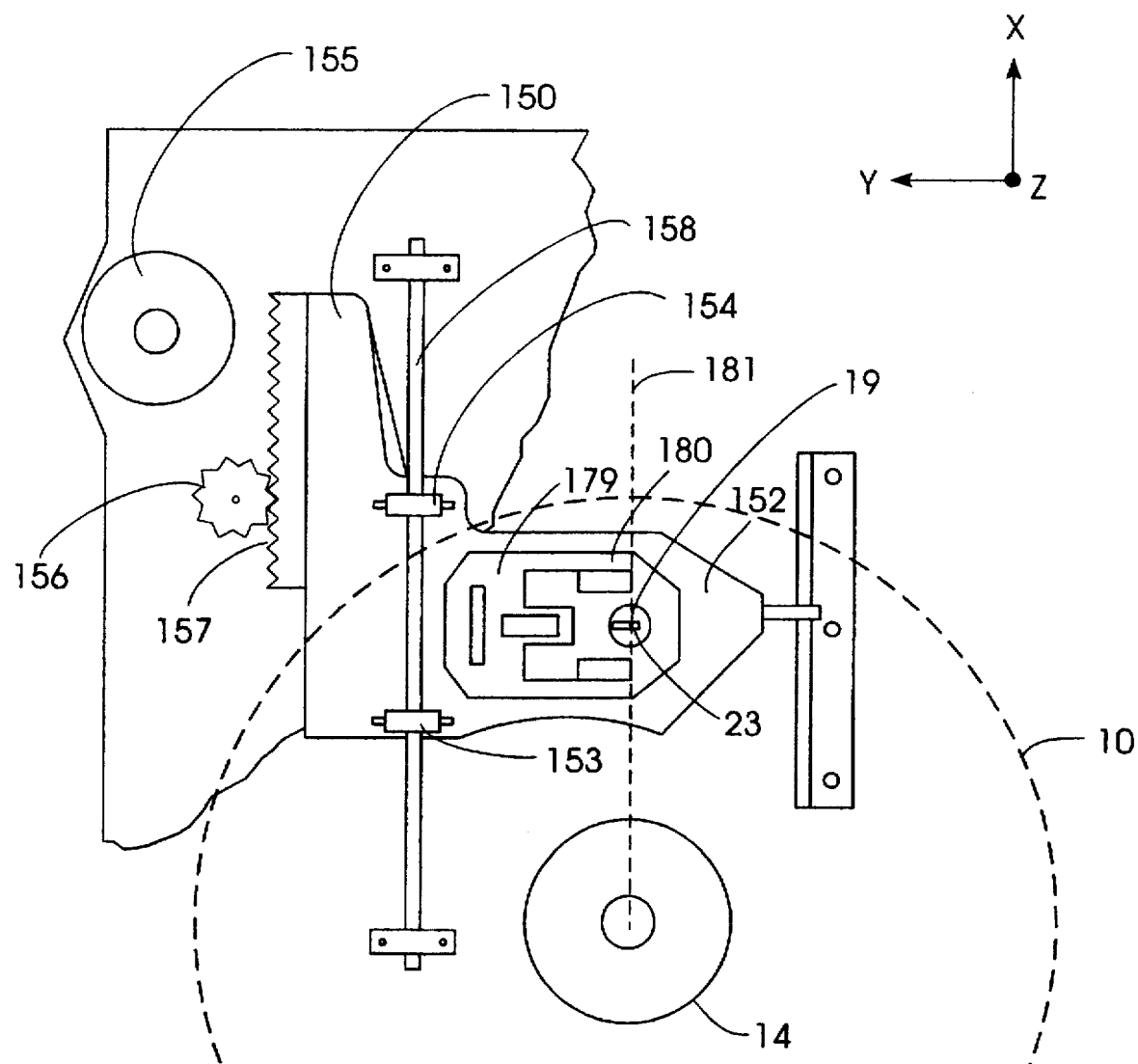
FIG. 3 is a view of the secondary actuator in the present invention.

The stylus load on the disk, or its height above the disk as sensed by the deflection of the cantilever if the AFM system is an "attractive mode" system, must be controlled and the stylus must be able to access different tracks. Referring to FIG. 3, the actuator 22 includes a primary actuator 180 that supports the cantilever 23 with its stylus 19 and is mounted to a secondary actuator 150. The secondary actuator 150 includes a movable carriage 152 with a linear gear 157 and guides 153, 154. A drive motor 155 drives gear 156 that engages linear gear 157 on carriage 152. This causes the carriage 152 to move in a direction parallel to a fixed shaft 158 along which the guides 153, 154 ride. The primary actuator 180 supports cantilever 23 with the stylus 19 on the cantilever free end. The primary actuator 180 is positioned on the carriage 152 so that the stylus 19 is moved along a line 181 corresponding to a radius of disk 10. The outer diameter of disk 10 is indicated by the dashed circle in FIG. 3. The secondary actuator 150 is much slower than primary actuator 180 and is used for coarse positioning of the stylus 19 to a band of tracks.

Figure 4:
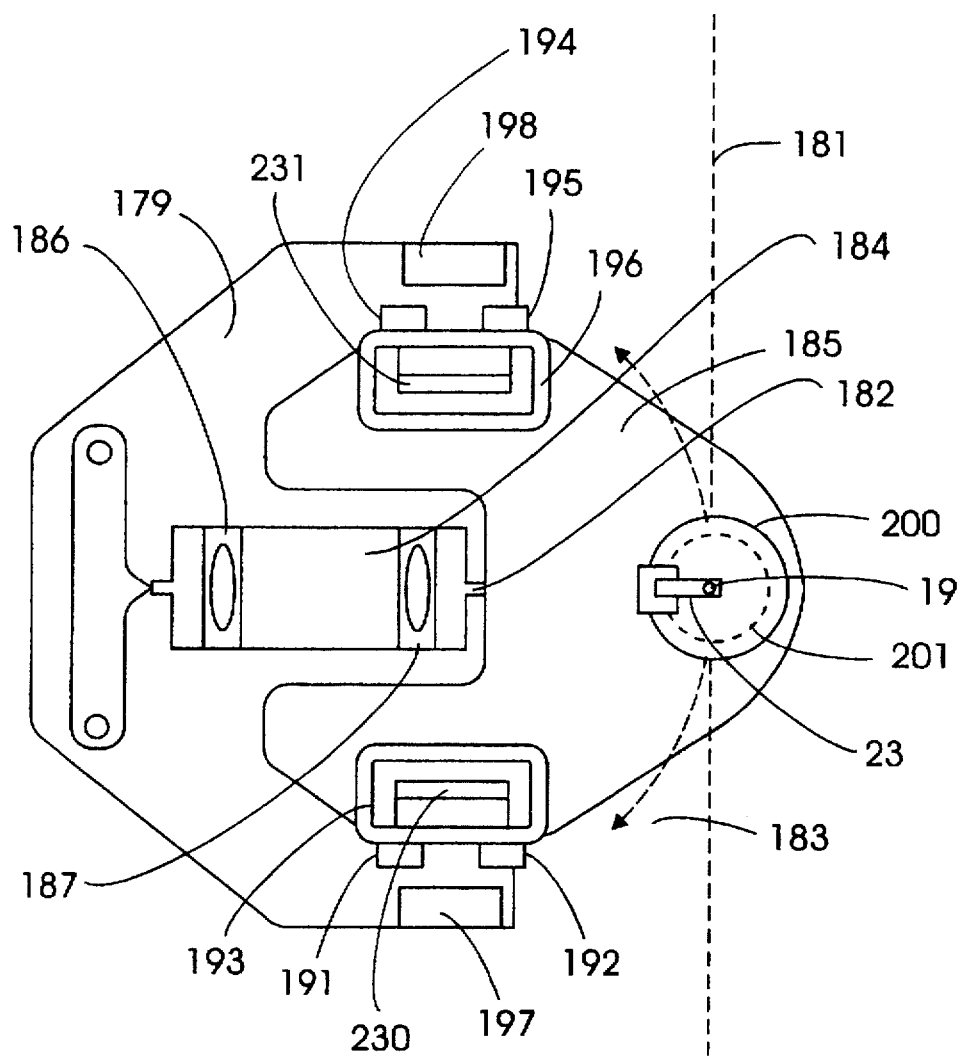
FIG. 4 is a view of the primary actuator in the present invention.

Referring to FIG. 4, the primary actuator 180 includes a fixed frame 179 mounted to secondary actuator 150, a bi-directional flexure 184 attached to frame 179, and a support arm 185. The primary actuator 180 is a voice coil type actuator similar to that used in audio CD and digital CD-ROM players. When used in CD players this type of actuator holds a lens in support arm 185.

In the present invention the primary actuator 180 supports the cantilever 23 via a holder 200 attached to support arm 185. In contrast to the CD player application the primary actuator of the present invention is controlled to apply a load force so the stylus 19 is maintained in contact or near contact with the surface of the disk, unlike the CD player application where the lens is maintained several millimeters from the surface of the disk. In the AFM data storage application the primary actuator tracks surface incongruences on the surface of the disk that are located in tracks spaced only approximately 100 nm apart, which is 1/16th the track pitch of approximately 1.6 microns for CD tracks.

The flexure 184 is fabricated from plastic and has flexure points corresponding to pivot 182 and hinges 186, 187. The flexure point at pivot 182 is plastic that is thin in the X direction but thick in the Z direction so that the support arm 185 is constrained to bend in the X-Y plane, i.e., to rotate as shown by arrow 183. Likewise, the flexure points at hinges 186, 187 are plastic that is thin in the Z direction but wide in the Y direction, so that support arm 185 can only bend in the Z direction. Thus, the support arm 185 can move bidirectionally in the X and Z directions. The flexure points can be formed in other ways, such as by suspending the support arm from wires.

Figure 5:
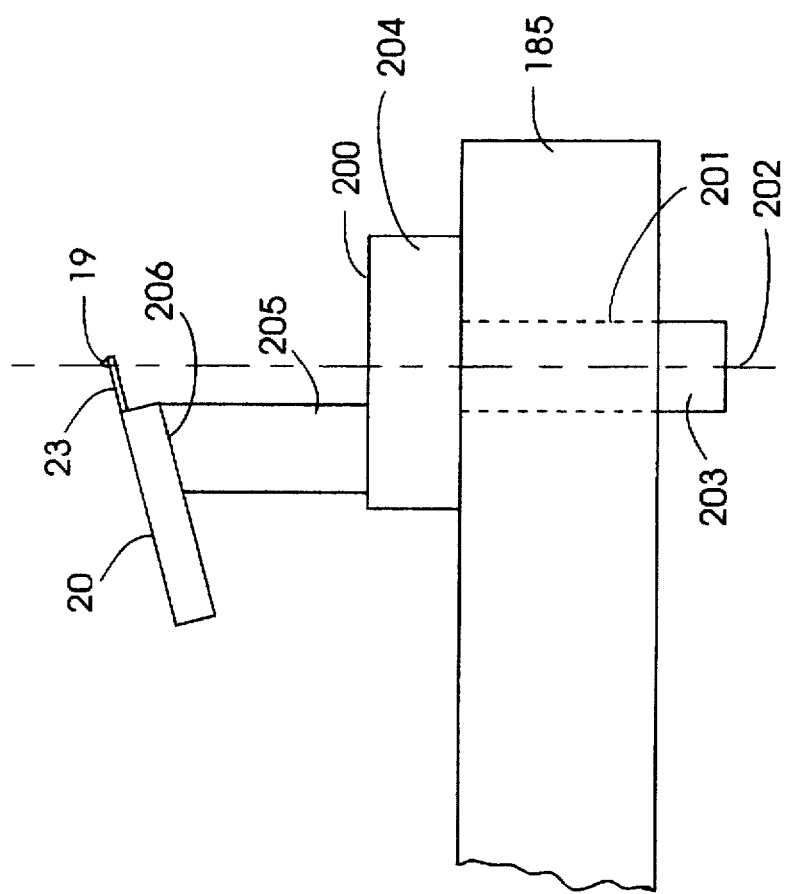
FIG. 5 is an enlarged view of the end of the support arm of the primary actuator of FIG. 5 illustrating the manner in which the cantilever and stylus are mounted.

Referring to FIG. 5, a side view of the end of support arm 185 illustrates the attachment of cantilever 23 and stylus 19. The support arm 185 has a bore 201, into which a CD lens would have been attached if the primary actuator is a modified CD player actuator. The bore 201 has a central longitudinal axis 202 parallel to the Z axis. A plastic holder 200 has a post 203 which is centered in bore 201. The holder 200 also has a wide support flange 204 centered around the post 203 for securely gluing the holder to the support arm 185. Alternatively, the post 203 can be threaded and secured to the support arm 185 by means of a nut. A second post 205 is attached to the flange 204 offset from post 203. Post 205 terminates in a slanted flat 206. The amount of offset of post 205 from post 203 is selected so that the end of the stylus 19 will be aligned with the axis 202. A cantilever base 20 is glued to the slanted flat 206. The cantilever 23 with stylus 19 on its free end is an extension of cantilever base 20. The slanted flat 206 makes an acute angle with respect to the support arm 185 and therefore with the surface of the disk, so that cantilever 23 will approach the surface of the disk at the desired angle. This acute angle is approximately 10–15 degrees if the stylus is the type that extends generally perpendicularly from the plane of the cantilever. The cantilever base 20 is positioned on post 205 so that the stylus 19 is located at the center of bore 201 coincident with axis 202. The length of post 205 is selected so that the stylus 19 can contact the surface of the disk without any portion of the primary actuator 180 contacting the disk. In the preferred embodiment the weight of the holder 200, cantilever base 20 and cantilever 23 is designed to be close to that of a CD player lens, which is approximately 120 milligrams. Also, as shown in FIG. 5, the post 203 extends in a direction away from the cantilever 23 beyond the top surface of support arm 185 so that the center of mass of the holder 200, cantilever base 20 and cantilever 23 is essentially coincident with the X-Y plane in which the support arm 185 moves. By minimizing any changes to the weight and center of mass of the primary actuator 180, changes to its mechanical resonance are kept to minimum. While FIG. 5 does not show the elements of the support arm 185 and cantilever 23 precisely to scale, it does illustrate the relatively small dimensions involved in the present invention. The cantilever 23 has a thickness in the range of approximately 0.5–4 microns and a length in the range of approximately 20–150 microns, and the stylus 19 has a length in the range of approximately 1–3 microns.

To control the load of the stylus 19 on the disk, the actuator 180 is moved perpendicular to the disk surface (out of the drawing in FIG. 4). To position the stylus 19 within a data track, or to a data track in a band of data tracks, the actuator is moved to rotate the stylus about pivot 182 as shown by arrow 183. While this movement is rotary, the arc through which the stylus 19 moves is so small relative to the radius of the disk 10 that the movement of the stylus is essentially along the radial line 181 of the disk 10.

Electromagnetic coils 191–196 and permanent magnets 197, 198 are mounted to frame 179 and provide the force required to move the support arm 185 in its two directions. When a current is passed through one of the coils, a magnetic field is generated, and in the presence of the field from an associated permanent magnet, the coil will experience a force. The magnets 197, 198, along with their associated magnetic yokes 230, 231, are positioned to produce fields along the central axis of each associated coil. When a current is passed through a coil, the resulting force will be along the central axis of the coil (the imaginary axis around which the coil turns are wound) and will move the support arm 185 in a direction essentially perpendicular to the plane of the coil winding. As shown in FIG. 4, the coils 193, 196 form a set of coils with turns or windings in the X-Y plane, and will each produce a magnetic field pointing along the Z axis. This will cause the support arm 185 to move along the Z axis. Likewise, coils 191,192 form a set of coils and coils 194, 195 form a set of coils. The four coils 191, 192 and 194, 195 are all wound in the Y-Z plane and will produce magnetic fields along the X axis. The pivot 182, about which the support arm 185 moves for radial positioning of the stylus 19, is located on a line midway between the set of coils 191, 192 and between the set of coils 194, 195. By winding coils 191 and 192 in opposite directions and coils 194 and 195 in opposite directions, the forces from each coil in a set will oppose one another, and the support arm 185 will pivot about pivot 182. Thus, by controlling the current in the three sets of coils, the actuator support arm 185 can be made to move in the Z and X directions. The Z-axis motion is used for controlling the load on the stylus 19, and the X-axis motion for fine control of the position of the stylus 19 on a track and within a band of tracks.

The three sets of coils 191–196 of the primary actuator 180 are connected to control circuits. The coils 193, 196 that control stylus movement in the Z direction are connected to the load control circuit 30 shown in FIG. 6 and the coils 191, 192 and 194, 195 that control fine tracking movement of the stylus in the X-Y plane (along a radius of the disk) are connected to the tracking control circuit 31 shown in FIG. 7.

The load control circuit 30 is an integral control, but could also include proportion and differential control. The frequency response of the load control circuit 30 is matched to the transfer function of the primary actuator. Referring to FIG. 6, this is accomplished by adjusting the values of the resistors R1, R3, R6, R7 and the capacitors C1 and C2, as is common to those skilled in the art. The gain of the circuit is controlled by adjusting resistors R2 and R4 and is set as high as possible without causing the system to oscillate. The function of the circuit is to keep the stylus 19 resistance constant, indicating a constant loading force. This is done by comparing the low frequency component from the resistance measurement circuit 25 output with a set-point voltage value, which is determined by setting resistor R5. To begin reading data, the stylus must be brought into contact with the surface of the spinning disk. This is done by closing switches S1 and S2. Closing S1 starts operational amplifier OP1 to integrate and the load control circuit 30 outputs a voltage ramp to coils 193, 196. Referring again to FIGS. 3–4, this causes support arm 185 to move in the Z direction and the stylus 19 to approach the surface of disk 10. The stylus 19 comes into contact with the surface of the disk 10, at which time the cantilever 23 deflects and the resistance of piezoresistive region 24 begins to change. The change in the cantilever resistance is detected by the resistance measurement circuit 25, causing a change in its output $\Delta V$. The support arm 185 continues to lower the stylus 19 onto the disk 10 until $\Delta V$ becomes equal to the set point voltage. At that point, the input to operational amplifier OP2 is zero, which is the stable operating point of the circuit 30. Thus, operational amplifiers OP2 and OP3 will continuously adjust the circuit output to coils 193, 196 so as to maintain the $\Delta V$ input from resistance measurement circuit 25 equal to the set point voltage, so that there is zero input into OP2. In this manner the vertical position of the support arm 185 is continually adjusted to maintain a constant load on stylus 19. When it is desired to stop reading data, the stylus 19 is disengaged from the surface of disk 10 by opening switches S1 and S2, causing the support arm 185 to rise up away from the disk surface. The load control circuit 30 maintains a loading force of approximately $10^{-7}$ newtons on the stylus 19. This amount of force corresponds to a deflection of the stylus 19 of approximately 50 nm.

In the preferred embodiment, the secondary actuator 150 is used for coarse track positioning to move the primary actuator 180 between different radially spaced bands of tracks. The secondary actuator 150 thus moves the stylus 19 relative to the disk 10 in a coarse manner. This can be done be dead reckoning or open loop servoing, with the secondary actuator 150 not connected to a control circuit. Small errors in the coarse position of the secondary actuator 150 can be corrected for by the primary actuator 180 and its fine tracking control circuit 31. Alternatively, the radial position of the primary actuator 180 can be monitored, and the secondary actuator 150 moved as so to keep the primary actuator 180 near the center of its range. This arrangement, referred to as a master-slave, is known to those skilled in the control system art.

The fine positioning control of the stylus to maintain it on a data track and to move it within a band of data tracks is done with the tracking control circuit 31 shown in FIG. 7. The frequency response of the circuit is adjusted using R21, R26, R27, C21, C22 and the gain adjusted with R22 and R24. In this case, the secondary actuator 150 is used to bring the stylus 19 into the desired radial band of tracking marks on the disk. Once the stylus 19 is located in the desired band, switch S21 is closed. The input of the circuit is the output of the tracking analysis circuit 29 (FIG. 1), which is zero when the stylus 19 is on the desired track. Thus, operational amplifiers OP22 and OP23 will continually adjust the output of the tracking control circuit, which is connected to the two coil sets 191, 192 and 194, 195, so as to keep the tracking analysis circuit 29 output at zero. When it is desired to turn off the tracking control, as might be the case when the stylus 19 is to be moved between bands, switch S1 is opened.

Figure 8:
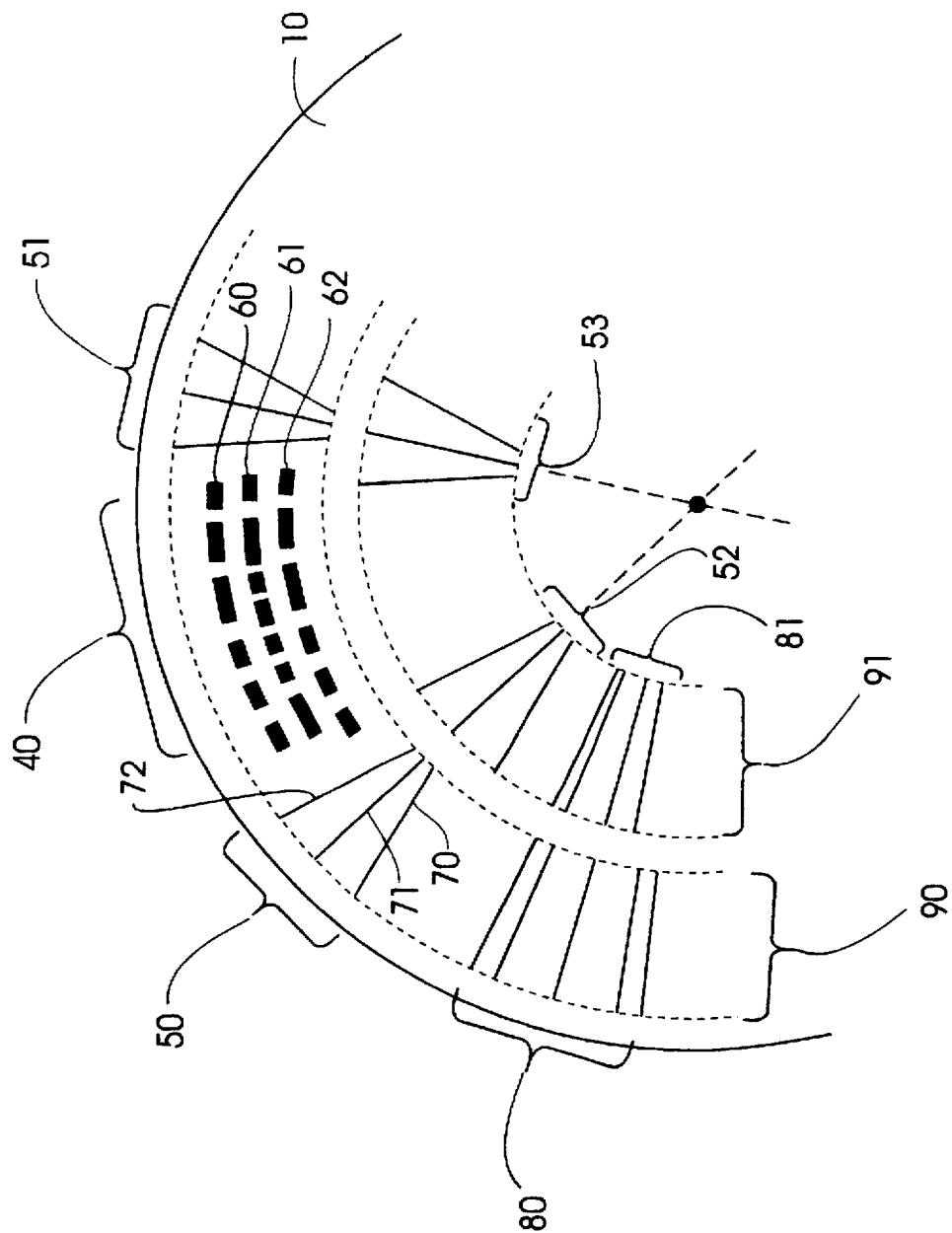
FIG. 8 is a representation of a portion of the disk surface illustrating the surface incongruences used for data features and tracking lines used for fine tracking control by the actuator.

Referring now to FIG. 8, which is a section of disk 10, the storage disk has several shapes of incongruences or marks embossed on it, each serving a different purpose. First, the data features 40 comprise narrow, variable length pits and islands forming a pulse width modulation encoding scheme. Alternatively, the data features could be varied in depth, thus forming an amplitude modulation scheme. The smallest of the data features 40 are approximately 50 nm wide and are arranged in tracks which are circular in shape and centered about the center of the storage disk 10. The data features 40 are shown as sections of three radially adjacent and radially-spaced data tracks 60–62. Data tracks 60–62 are located in a radial band 90 of data tracks. A second band 91 of data tracks is depicted radially inwardly of band 90.

In the preferred embodiment, the disk is a read-only disk. The data features and other marks are written on a master disk and then embossed into the storage disk. The marks are formed on the master disk by electron beam writing on PMMA resist-covered silicon oxide, as described by Terris et al., "Nanoscale Replication for Scanning Probe Data Storage", *Appl. Phys. Lett.*, Vol. 69, No. 27, 30 Dec. 1996, pp. 4262–4264. After exposing the resist using an electron beam, the written data pattern is transferred to the silicon oxide by appropriate developing of the resist and etching. Alternatively, a master can be made using an AFM tip to create marks in a polymer master, which is also described in the Terris et al. paper.

The pattern of surface incongruences is then embossed into the storage disk by molding, as described in U.S. Pat. No. 4,948,703. A thin film of a photocurable polymer film is formed on the surface of the master. Prior to forming this film, the master is coated with a release agent, such as amorphous TbFeCo. A glass substrate, which forms a base for the storage disk, is pressed against the thin polymer film. The film is exposed to ultraviolet light to cure it, thus forming a hardened polymer film. The master and disk support are separated, leaving the hardened polymer attached to the glass support. Alternatively, marks can also be formed by injection molding or by pressing the master into a heated PMMA film, as described by Chou et al., "Imprint Lithography with 25-Nanometer Resolution", *Science*, Vol. 272, 5 Apr. 1996, pp. 85–87. The data marks represent a series of 1's and 0's and thus represent stored data. Such marks can alternatively be written onto the storage disk directly by the stylus to form a write-once type of data storage medium, as described by Mamin, "Thermal Writing Using a Heated Atomic Force Microscope Tip", *Appl. Phys. Lett.*, Vol. 69, No. 3, 15 Jul. 1996, pp. 433–435.

The input to the fine tracking control circuit 31 (FIG. 7) is from the tracking analysis circuit 29, which calculates a tracking error signal (TES) that is representative of the radial position of the stylus 19. The tracking information used by the tracking analysis circuit 29 is formed on the surface of the disk and can come from contiguous wobble marks placed on opposite sides of the data track centerline in a manner analogous to sector servo marks in magnetic recording, as described by Mamin et al., "High-density Data Storage Using Proximal Probe Techniques", *IBM J. Res. Develop.*, Vol. 39, No. 6, November 1995, pp. 687–688. However, in the preferred embodiment the TES is generated from tracking information in the form of sets or triplets of tracking or timing lines placed on the disk 10, in the manner to be described below with repsect to FIGS. 8–10.

Referring again to FIG. 8, a second shape of incongruences, the tracking marks, are indicated as tracking line sets 50, 51, 52, 53. These are narrow lines, approximately 50 nm high (or deep) and 100 nm wide, and are electron beam written on the master and embossed into the storage disk as described above. To maintain the stylus 19 on a given data track, several of which are shown schematically in FIG. 8 as tracks 60, 61, 62, the time interval between successive tracking lines is measured. The lines are grouped in sets of three lines per set, forming a triplet. The middle line of each triplet, such as line 71 in set 50, is aligned substantially along a radius of the disk 10. The other two lines (70, 72 in set 50) each form an angle of 22.5 degrees to the middle line 71 and are positioned so that the lines do not intersect. These two lines 70, 72 are thus nonparallel and nonradial lines. The triplet sets 50, 51 are uniformly spaced one from another along the track direction and are written around the entire circumference of the disk, thus forming a band of triplets. The triplets are spaced and are of a radial length such that lines from one triplet do not intersect lines from adjacent triplets. The radial length of the band, the number of triplets around the circumference, and the angle between the lines within a triplet may be different at different disk radii. It is preferable to have many data tracks within one band. In the preferred embodiment, at a band diameter of 10 mm and a band radial length of 30 microns, there are 300 tracks placed on a 0.1 micron track pitch. There can be up to 1000 triplets in such a band, although fewer could be written so as to increase the area available for data features. Bands of triplets are written so that one band begins where the previous band ended, thus covering the entire data-containing area of the storage disk. Placed between the triplets are the data features, as shown by data features 40 in tracks 60–62 located between adjacent triplet sets 50, 51, for example.

Within each band, along with the sets of tracking marks and data features, band identification (ID) marks 80 (in band 90) and 81 (in band 91) are also written by electron beam and embossed onto the disk. These ID marks, when decoded, are used to determine which band of triplets the stylus 19 is reading. In addition, the ID marks are recognized by the decoder 27 to signify the position of a triplet. Since the spacing between triplets is known, the position of all triplets around the circumference can thus be determined. This information is used to generate a timing gate signal for use in the timing analysis, as will be explained below.

Figure 9:
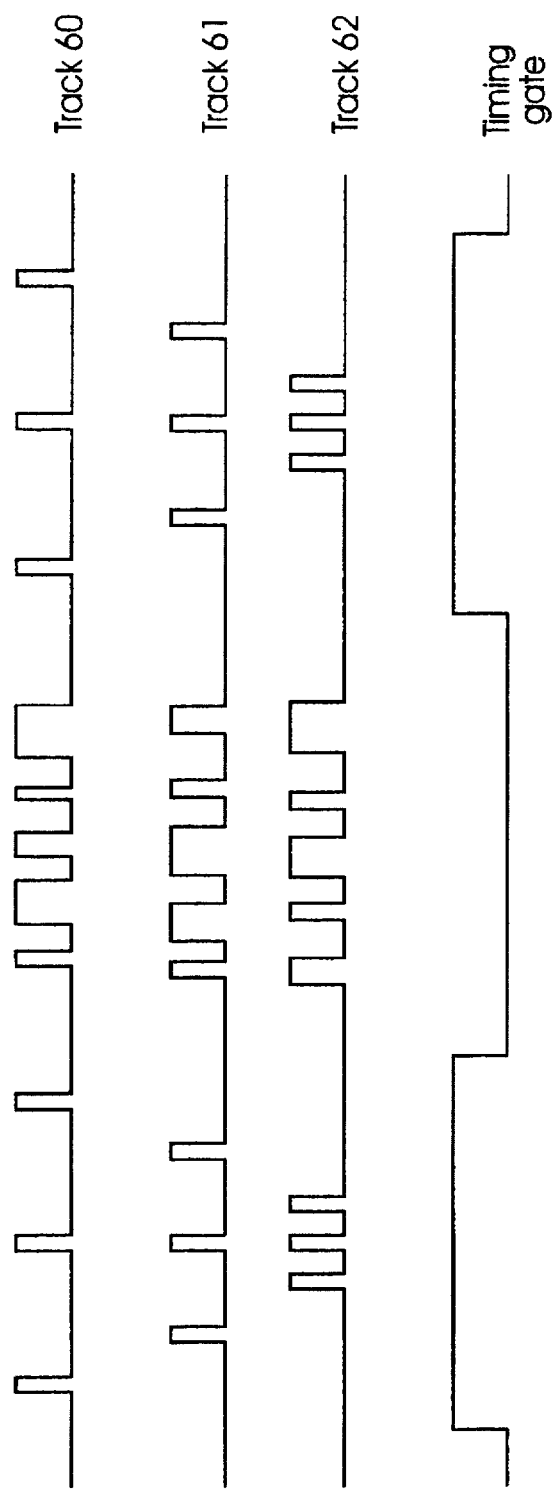
FIG. 9 is a graph of decoder output for three different data tracks illustrating the timing of the tracking lines relative to a timing gate.

FIG. 9 shows a schematic of the output of decoder 27 at three different data tracks 60, 61 and 62 within band 90. Track 60 is located radially outward of track 61, which in turn is located radially outward of track 62. If track 61 is the desired track, then the spacing of the lines (70, 71, 72) along the track direction within one triplet (50) is larger on track 60 than on track 61. Similarly, the line spacing is smaller on track 62 than on tracks 61 or 60. Thus, the time interval between the two nonparallel, nonradial lines within a triplet (e.g., lines 70, 72 in triplet 50) determines whether the stylus 19 is on track and is used to maintain the stylus 19 on track. The bottom portion of FIG. 9 shows the timing gate signal, which high during the time windows when the tracking lines are expected to be detected.

Figure 10:
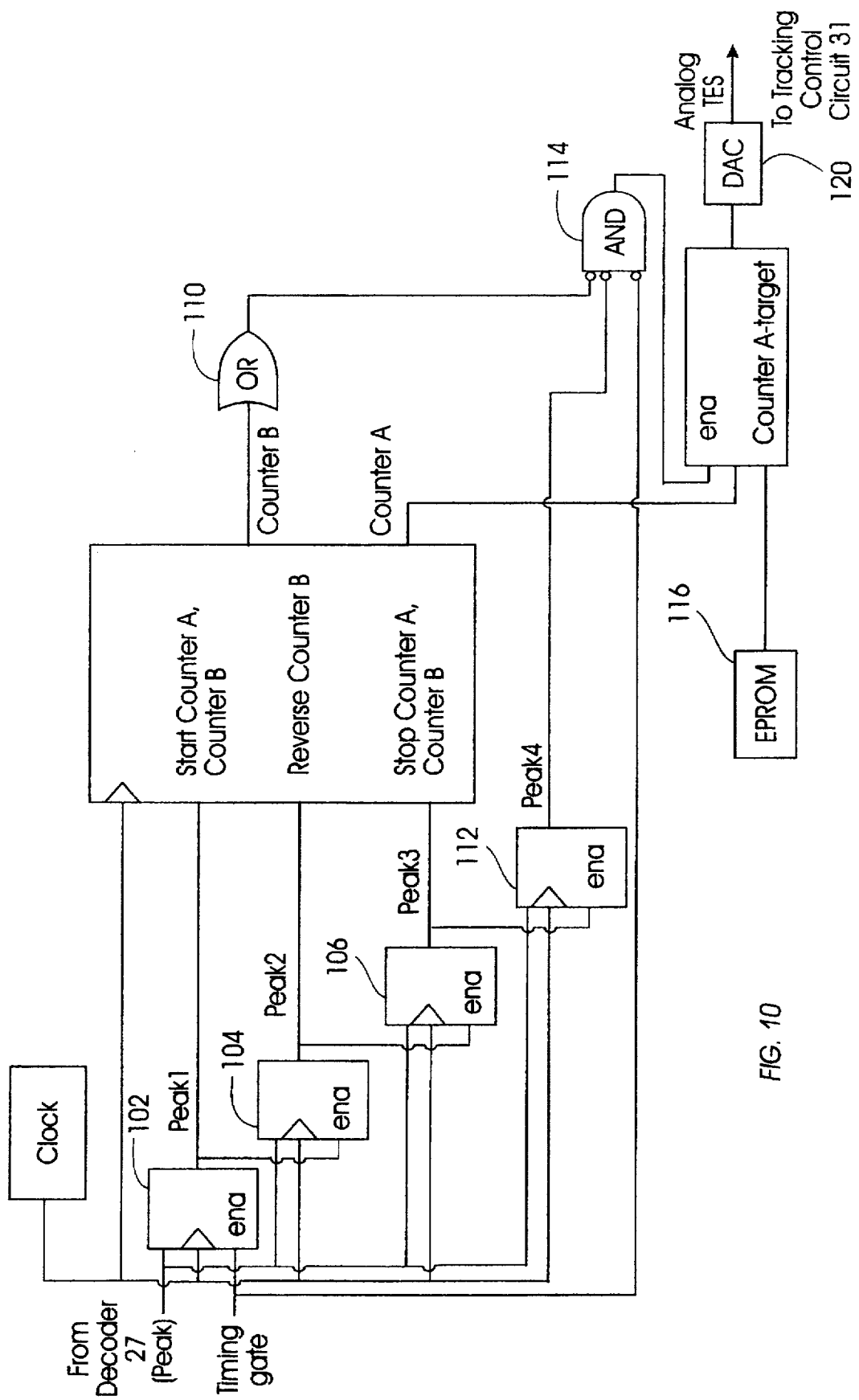
FIG. 10 is a block diagram of the tracking analysis circuit for generating a tracking error signal (TES) for use by the actuator.

FIG. 10 is a schematic of the timing logic used to determine whether the stylus is on track. After detecting the band ID marks 80, the decoder 27 generates a timing gate signal, which is high for the expected duration of a triplet, at the expected time intervals between triplets. The timing gate and decoder signals are input into the tracking analysis circuit 29 (FIG. 1). The first peak (peak 1) detected after the timing gate goes high causes two counters, A and B, to start incrementing. This peak is caused by line 70 in triplet 50 and is detected using a latch 102, which is enabled by the timing gate signal and transfers the enable signal level to the latch output each time a peak is received. The latch 102 output is labeled as peak 1 in FIG. 10. The counters A and B tally the number of clock cycles elapsing before being stopped. The counters can either count up, where for each additional clock cycle the stored total is incremented by 1, or down, where for each additional clock cycle the stored total is decremented by 1. The clock is generated by the tracking analysis circuit 29 using standard electronic techniques, for example, by a crystal oscillator. At the second peak (peak 2) corresponding to line 71 in triplet 50, detected using a latch 104 having peak 1 as the enable signal, counter B is reversed while counter A continues to accumulate. At the third peak (peak 3) corresponding to line 72 in triplet 50, detected using a latch 106 having peak 2 as the enable signal, both counters A and B are halted and the values stored. The counters need to have a sufficient number of bits to store the expected number of clock cycles. In the preferred embodiment, this is at least 12 bits.

After the counters have stopped, the content of counter B is examined. Ideally, if the three tracking lines 70–72 within the triplet are evenly spaced, this will be 0. A simple method of determining if this is the case is to feed the counter B bit lines to a 12-bit OR gate 110. If all 12 bits are 0, then the output of OR gate 110 will be 0. Since small errors in the tracking line placement or clock variations can produce slight differences in the measured time between the lines, it is desirable to allow for counter B to be slightly different from 0. This is achieved by comparing only the 10 or 11 most significant bits of counter B in the OR gate 110. The output of OR gate 110 is used to confirm that counter A contains valid track timing information.

Before generating a tracking error signal (TES), a second validity check is made. While the timing gate from the decoder 27 is high, only three signals should be received (FIG. 9). A latch 112, having peak 3 as the enable signal, is used to look for a fourth peak (peak 4). If none is received, then the peak 4 signal level will be low when the timing gate returns to a low level. Thus, a valid timing measurement will have been made if both the OR gate 110 level and peak 4 level are low when the timing gate returns low. The satisfying of these three conditions is determined using AND gate 114 with inverted inputs. A high output of AND gate 114 signifies a valid timing measurement.

This AND gate 114 output is the enable signal for updating the TES. Counter A, which is the elapsed time between the first and third peaks (corresponding to lines 70 and 72 in triplet 50), is compared to a target value. This target value is retrieved from a lookup table, such as an EPROM 116. Each data track radial position has a target value stored in EPROM 116. The difference between the target value and counter A is a digital TES and is converted to an analog TES by DAC 120 and input to the tracking control circuit 31 (FIG. 7). The tracking control circuit 31 drives the primary actuator 180 to move the stylus 19 toward the desired track or to maintain it on the desired track, in the manner described above. If the AND gate 114 remains low, then the TES is not updated. After the timing gate goes low, the tracking analysis circuit 29 is reset and waits for the next high timing gate signal indicating the next triplet.

While the preferred embodiment of the AFM data storage system is a plastic disk with the data stored as surface incongruences, other disk materials and other data storage mechanisms are also possible for defining machine readable information in an AFM data storage system. For example, electrical charge can be stored in a silicon nitride layer on a silicon disk and read back as a change in capacitance, as described by Terris, et al., "Data Storage in NOS: Lifetime and Carrier-to-Noise Measurements", *IEEE Transactions on Electron Devices*, Vol. 42, No. 5, May 1995, PP. 944–949. Data can also be stored as a change in surface resistance and read back as a change in tip-sample conductivity, as described by Kado et al., "Nanometer-scale recording on chalcogenide films with an atomic force microscope", *Appl. Phys. Lett.*, Vol. 66, No. 22, 29 May 1995, pp. 2961–2962.

As used herein, the term "scanning" is meant to refer to movement of the AFM stylus or tip relative to the sample, and is not limited merely to conventional AFM imaging. The scanning can be done either with the tip in contact with the surface, or with the tip in close proximity or near-contact to the surface.

While the preferred embodiments of the present invention have been illustrated in detail, it should be apparent that modifications and improvements may be made to the invention without departing from the spirit and scope of the invention as described in the following claims.

What is claimed is:

1. An atomic force microscope system comprising:

a sample to be scanned, the sample having surface features;

a flexible cantilever having on its free end a stylus for sensing the surface features of the sample by deflecting back and forth when the sample is moved relative to the stylus;

a bidirectional actuator to which the cantilever is attached for moving the stylus in a plane generally parallel to the surface of the sample and for moving the stylus perpendicularly relative to the surface of the sample, the actuator comprising a frame, a plurality of permanent magnets mounted on the frame, a support arm attached to and supporting the cantilever on the cantilever end opposite its free end, a flexure holding the support arm on the frame in a plane generally parallel to the surface of the sample, the flexure permitting movement of the support arm in a plane parallel to the surface of the sample and perpendicularly relative to the surface of the sample, a first set of electrical coils mounted on the support arm and located within the magnetic field of the permanent magnets, and a second set of electrical coils mounted on the support arm and located within the magnetic field of the permanent magnets, each of the coils in the second set having a central axis perpendicular to the central axis of each of the coils in the first set;

a detector for detecting deflections of the cantilever caused by the features on the surface of the sample, and for generating an output signal representative of the deflections of the cantilever;

a load control circuit responsive to the output signal from the deflection detector and coupled to the first set of electrical coils on the actuator for generating a current signal to the first set of electrical coils to cause the actuator support arm to move perpendicularly relative to the surface of the sample; and circuitry coupled to the second set of electrical coils on the actuator for generating a current signal to the second set of electrical coils to cause the actuator support arm to move in a plane generally parallel to the surface of the sample so as to position the stylus to a desired position on the surface of the sample.

2. The system according to claim 1 wherein the support arm has a bore having an axis perpendicular to the surface of the sample, and further comprising a cantilever holder having a post inserted into said bore, the cantilever being attached to the cantilever holder with the stylus aligned on said bore axis.

3. The system according to claim 2 wherein the cantilever holder has a slanted flat surface and wherein the cantilever includes a cantilever base at the end opposite the cantilever free end, the cantilever base being attached to the slanted flat surface of the cantilever holder, whereby the cantilever lies in a plane forming an acute angle with the surface of the sample.

4. An atomic force microscope based data storage system comprising:

a data storage sample having a surface with machine-readable data features formed in a plurality of spaced-apart tracks, the medium surface including tracking marks;

a flexible cantilever having on its free end a stylus for sensing the data features and tracking marks on the medium by deflecting back and forth when the medium is moved relative to the stylus;

means connected to the medium for moving the medium relative to the stylus;

a bidirectional actuator to which the cantilever is attached for maintaining the stylus on a desired track and for moving the stylus perpendicularly relative to the surface of the medium, the actuator comprising a frame, a plurality of permanent magnets mounted on the frame, a support arm having attached to and supporting the cantilever on the cantilever end opposite its free end, a flexure holding the support arm on the frame in a plane generally parallel to the surface of the medium, the flexure permitting movement of the support arm in a plane parallel to the surface of the medium and perpendicularly relative to the surface of the medium, a first set of electrical coils mounted on the support arm and located within the magnetic field of the permanent magnets, second set of electrical coils mounted on the support arm and located within the magnetic field of the permanent magnets, each of the coils in the second set having a central axis perpendicular to the central axis of each of the coils in the first set;

a detector for detecting deflections of the cantilever caused by the tracking marks on the medium surface, and for generating an output signal representative of the deflections of the cantilever;

a load control circuit responsive to the output signal from the deflection detector and coupled to the first set of electrical coils on the actuator for generating a current signal to the first set of electrical coils to cause the actuator support arm to move perpendicularly relative to the surface of the medium;

a tracking analysis circuit for generating, from the output signal from the deflection detector, a tracking error signal representative of the amount the stylus is off track; and a tracking control circuit responsive to the tracking error signal and coupled to the second set of electrical coils on the actuator for generating a current signal to the second set of electrical coils to cause the actuator support arm to move in the plane parallel to the surface of the medium so as to position the stylus to the desired track.

5. The data storage system according to claim 4 wherein the support arm has a bore having an axis perpendicular to the surface of the medium, and further comprising a cantilever holder having a post inserted into said bore, the cantilever being attached to the cantilever holder with the stylus aligned on said bore axis.

6. The data storage system according to claim 5 wherein the cantilever holder has a slanted flat surface and wherein the cantilever includes a cantilever base at the end opposite the cantilever free end, the cantilever base being attached to the slanted flat surface of the cantilever holder, whereby the cantilever lies in a plane forming an acute angle with the surface of the medium.

7. The data storage system according to claim 4 wherein the medium is a disk, wherein the tracks are generally radially-spaced tracks, and wherein the actuator moves the stylus along a radius of the disk in response to the current signal from the tracking control circuit.

8. The data storage system according to claim 7 wherein the tracks are discrete generally concentric tracks.

9. The data storage system according to claim 7 wherein the tracks are generally spiral tracks.

10. An atomic force microscope based data storage disk drive comprising:

a data storage disk having on its surface at least one band of radially-spaced data tracks of surface incongruences representing machine-readable information and a plurality of sets of tracking lines circumferentially spaced around the data tracks, each set of tracking lines comprising at least two lines, at least one of which is a nonradial line;

a motor for rotating the disk;

a flexible silicon cantilever containing a piezoresistive region and having a contact stylus on its free end for engaging and contacting the surface incongruences and tracking lines on the disk during rotation of the disk;

a bidirectional primary actuator to which the cantilever is attached for moving the stylus across the surface of the disk to maintain the stylus on a desired track and for moving the stylus perpendicularly relative to the surface of the disk, the bidirectional primary actuator comprising a frame, a plurality of permanent magnets mounted on the frame, a support arm attached to and supporting the cantilever on the cantilever end opposite the stylus, a flexure holding the support arm on the frame in a plane generally parallel to the surface of the disk, the flexure permitting movement of the support arm in a plane parallel to the surface of the disk and perpendicularly relative to the surface of the disk, a first set of electrical coils mounted on the support arm and located within the magnetic field of the permanent magnets, and a second set of electrical coils mounted on the support arm and located within the magnetic field of the permanent magnets, each of the coils in the second set having a central axis perpendicular to the central axis of each of the coils in the first set;

electrical resistance detection circuitry coupled to the piezoresistive region of the cantilever for detecting changes in resistance of the piezoresistive region in response to deflection of the stylus caused by the surface incongruences and tracking lines on the disk and for generating an output signal representative of the deflections of the stylus;

a load control circuit responsive to the output signal from the electrical resistance detection circuitry and coupled to the first set of electrical coils on the primary actuator for generating a current signal to the first set of electrical coils to cause the primary actuator support arm to move perpendicularly relative to the surface of the disk so as to maintain a generally constant loading force on the stylus;

a tracking analysis circuit for generating, from the output signal from the electrical resistance detection circuitry, a tracking error signal representative of the amount the stylus is off track;

a tracking control circuit responsive to the tracking error signal and coupled to the second set of electrical coils on the primary actuator for generating a current signal to the second set of electrical coils to cause the primary actuator support arm to move in the plane parallel to the surface of the disk so as to position the stylus to the desired track on the surface of the disk; and a data decoding circuit for receiving the output signal from the electrical resistance detection circuitry and for converting the output signal to digital data signals representative of the machine-readable information formed by the surface incongruences on the disk.

11. The data storage disk drive according to claim 10 wherein the data tracks are discrete generally concentric data tracks.

12. The data storage disk drive according to claim 10 wherein the data tracks are generally spiral data tracks.

13. The data storage disk drive according to claim 10 wherein the support arm has a bore having an axis perpendicular to the surface of the disk, and further comprising a cantilever holder having a post inserted into said bore, the cantilever being attached to the cantilever holder with the stylus aligned on said bore axis.

14. The data storage disk drive according to claim 13 wherein the cantilever holder has a slanted flat surface and wherein the cantilever includes a cantilever base at the end opposite the cantilever free end, the cantilever base being attached to the slanted flat surface of the cantilever holder, whereby the cantilever lies in a plane forming an acute angle with the surface of the medium.

15. The data storage disk drive according to claim 10 wherein the disk has at least two bands of data tracks and further comprising a secondary actuator to which the frame of the primary actuator is attached, the secondary actuator being located relative to the disk so as to move the stylus in a generally radial direction relative to the disk, whereby the stylus can be positioned from one band of data tracks to another band of data tracks.

* * * * *